(12) United States Patent
Dudik et al.

(10) Patent No.: US 11,248,750 B2
(45) Date of Patent: Feb. 15, 2022

(54) LED LIGHTING UNITS, MATERIALS, AND OPTICAL COMPONENTS FOR WHITE LIGHT ILLUMINATION

(71) Applicant: Current Lighting Solutions, LLC, East Cleveland, OH (US)

(72) Inventors: David C. Dudik, Shaker Heights, OH (US); Thomas J. Boyle, East Cleveland, OH (US); Jianmin He, East Cleveland, OH (US); James Edward Murphy, Niskayuna, NY (US); Dengke Cai, Mentor, OH (US)

(73) Assignee: Savant Technologies LLC, East Cleveland, OH (US)

( * ) Notice: Subject to any disclaimer, the term of this patent is extended or adjusted under 35 U.S.C. 154(b) by 0 days.

(21) Appl. No.: 15/579,378

(22) PCT Filed: May 11, 2016

(86) PCT No.: PCT/US2016/031779
§ 371 (c)(1),
(2) Date: Dec. 4, 2017

(87) PCT Pub. No.: WO2016/195938
PCT Pub. Date: Dec. 8, 2016

(65) Prior Publication Data
US 2018/0156420 A1    Jun. 7, 2018

Related U.S. Application Data

(63) Continuation of application No. 14/730,886, filed on Jun. 4, 2015, now abandoned.

(51) Int. Cl.
*H01J 1/62*     (2006.01)
*F21K 9/232*    (2016.01)
(Continued)

(52) U.S. Cl.
CPC .............. *F21K 9/232* (2016.08); *F21K 9/64* (2016.08); *F21V 3/0625* (2018.02); *F21V 7/30* (2018.02);
(Continued)

(58) Field of Classification Search
CPC .............. F21K 9/64; F21V 3/12; F21V 9/38
See application file for complete search history.

(56) References Cited

U.S. PATENT DOCUMENTS 4,395,653 A * 7/1983 Graff ................. H01K 1/32
313/112
2006/0255716 A1  11/2006 Tsutsumi et al.
(Continued)

FOREIGN PATENT DOCUMENTS

CN    102356479 A    2/2012
CN    103400926 A    11/2013
(Continued)

OTHER PUBLICATIONS

Artūras Žukauskas; "Statistical approach to color rendition properties of solid-state light sources"; Eleventh International Conference on Solid State Lighting, edited by Matthew H. Kane, Christian Wetzel, Jian-Jang Huang, Proc. of SPIE vol. 8123, 81230X © 2011.*
(Continued)

*Primary Examiner* — Andrew J Coughlin
(74) *Attorney, Agent, or Firm* — Wood IP LLC

(57) ABSTRACT

Materials and optical components formed thereof that are suitable for use in lighting units to obtain or approximate white light illumination, including lighting units that utilize one or more light-emitting diodes (LEDs) as a light source.

15 Claims, 7 Drawing Sheets

(51) Int. Cl.
  *H05B 33/14* (2006.01)
  *F21K 9/64* (2016.01)
  *F21V 3/06* (2018.01)
  *F21V 7/30* (2018.01)
  *F21V 9/08* (2018.01)
  *F21V 9/38* (2018.01)
  *F21V 9/40* (2018.01)
  *F21V 13/08* (2006.01)
  *G02B 5/20* (2006.01)
  *F21Y 101/00* (2016.01)

(52) U.S. Cl.
  CPC .............. *F21V 9/08* (2013.01); *F21V 9/38* (2018.02); *F21V 9/40* (2018.02); *F21V 13/08* (2013.01); *G02B 5/206* (2013.01); *H05B 33/14* (2013.01); *F21Y 2101/00* (2013.01)

(56) References Cited

U.S. PATENT DOCUMENTS

| | | | |
|---|---|---|---|
| 2011/0279998 A1 | 11/2011 | Su | |
| 2013/0105850 A1* | 5/2013 | Komatsu | H01L 33/505 |
| | | | 257/98 |
| 2013/0293098 A1* | 11/2013 | Li | F21V 3/02 |
| | | | 313/512 |
| 2014/0167601 A1 | 6/2014 | Harry et al. | |
| 2014/0268794 A1* | 9/2014 | Donofrio | F21V 9/08 |
| | | | 362/293 |
| 2014/0293608 A1* | 10/2014 | Kanahira | H01L 25/0753 |
| | | | 362/293 |
| 2015/0002034 A1* | 1/2015 | van de Ven | H05B 33/0824 |
| | | | 315/193 |
| 2015/0062892 A1* | 3/2015 | Krames | F21V 15/01 |
| | | | 362/231 |
| 2015/0252953 A1* | 9/2015 | Progl | F21K 9/23 |
| | | | 362/84 |

FOREIGN PATENT DOCUMENTS

| | | |
|---|---|---|
| CN | 103764788 A | 4/2014 |
| CN | 103883974 A | 6/2014 |
| WO | 2011108053 A1 | 9/2011 |

OTHER PUBLICATIONS

Anqing Liu; "Cultural Preferences to Color Quality of Illumination of Different Artwork Objects Revealed by a Color Rendition Engine"; IEEE Photonics Journal; vol. 5, No. 4, Aug. 2013.*

Artūras Žukauskas; "Solid-state lamps with optimized color saturation ability"; Feb. 1, 2010 / vol. 18, No. 3/ Optics Express, pp. 2287-2295.*

Chinese Decision of Rejection dated Feb. 3, 2021 which was issued in connection with Chinese Patent Application No. 201680032540.5 filed on Dec. 4, 2017 (English Translation attached).

Taiwan IPO Search Report dated May 21, 2019 which was issued in connection with Taiwan Patent Application No. 105115998 which was filed on May 23, 2016.

Chinese Office Action dated Apr. 15, 2019 which was issued in connection with Chinese Patent Application No. 201680032540.5 which was filed Dec. 4, 2017.

* cited by examiner

"Standard" LED-based Lamp (FIG. 3)

| Net CSI | Spectral | Absolute |
|---|---|---|
| Overall | -16 | -11 |
| Red | -58 | -52 |
| Yellow-Red | -4 | 8 |
| Yellow | 45 | 54 |
| Green-Yellow | 25 | 29 |
| Green | -55 | -51 |
| Blue-Green | -67 | -63 |
| Blue | -32 | -26 |
| Purple-Blue | 29 | 33 |
| Purple | 3 | 5 |
| Red-Purple | -54 | -51 |

"Modified" LED-based Lamp (FIG. 4)

| Net CSI | Spectral | Absolute |
|---|---|---|
| Overall | 0 | 12 |
| Red | -17 | -2 |
| Yellow-Red | 0 | 18 |
| Yellow | 23 | 46 |
| Green-Yellow | 24 | 34 |
| Green | 2 | 4 |
| Blue-Green | -15 | -1 |
| Blue | -11 | 0 |
| Purple-Blue | 13 | 22 |
| Purple | -1 | 0 |
| Red-Purple | -21 | -7 |

FIG. 5

LED LIGHTING UNITS, MATERIALS, AND OPTICAL COMPONENTS FOR WHITE LIGHT ILLUMINATION

BACKGROUND OF THE INVENTION

The present invention generally relates to lighting systems and related technologies. More particularly, this invention relates to materials and optical components suitable for use in lighting units to obtain or approximate white light illumination, particular examples of which include lighting units that utilize one or more light-emitting diodes (LEDs) as a light source.

LED lamps (sometimes referred to as "bulbs") provide a variety of advantages over more traditional incandescent and fluorescent lamps, including but not limited to a longer life expectancy, high energy efficiency, and full brightness without requiring time to warm up. As known in the art, LEDs (which as used herein may also encompass organic LEDs, or OLEDs) are solid-state semiconductor devices that convert electrical energy into electromagnetic radiation that includes visible light (wavelengths of about 400 to 750 nm). An LED typically comprises a chip (die) of a semiconducting material doped with impurities to create a p-n junction. The LED chip is electrically connected to an anode and cathode, all of which are often mounted within a package. Because, in comparison to other lamps such as incandescent or fluorescent lamps, LEDs emit visible light that is more directional in a narrower beam, LEDs have traditionally been utilized in applications such as automotive, display, safety/emergency, and directed area lighting. However, advances in LED technology have enabled high-efficiency LED-based lighting systems to find wider use in lighting applications that have traditionally employed other types of lighting sources, including omnidirectional lighting applications previously served by incandescent and fluorescent lamps. As a result, LEDs are increasingly being used for area lighting applications in residential, commercial and municipal settings.

FIG. 1 represents a nonlimiting commercial example of an LED-based lighting unit suitable for area lighting applications. The lighting unit (hereinafter, lamp) 10 is represented as a General Electric Energy Smart™ LED bulb or lamp (ANSI A19 type) configured to provide a nearly omnidirectional lighting capability. LED-based lighting units of various other configurations are also known. As represented in FIG. 1, the lamp 10 comprises a transparent or translucent cover or enclosure 12, an Edison-type threaded base connector 14, a housing or base 16 between the enclosure 12 and the connector 14, and heat-dissipating fins 18 that enhance radiative and convective heat transfer to the surrounding environment.

An LED-based light source, often an LED array comprising multiple LED devices, is typically located at the lower end of the enclosure 12 adjacent the base 16. Because LED devices emit visible light in narrow bands of wavelengths, for example, green, blue, red, etc., combinations of different LED devices are often combined in LED lamps (or more typically, LED(s) are combined with phosphor(s))to produce various light colors, including illumination that is perceived by an average human eye to be white. The LED devices may be mounted on a carrier mounted to or within the base 16, and may be encapsulated on the carrier, for example, with a protective cover, often formed of an index-matching material to enhance the efficiency of visible light extraction from the LED devices. As a nonlimiting example, FIG. 2 represents a portion of an LED device 20 of a type that comprises a dome 22 that serves as an optically transparent or translucent envelope enclosing an LED chip 24 mounted on a printed circuit board (PCB) 26. A phosphor may also be used to emit light of color other than what is generated by an LED. For this purpose, the inner surface of the dome 22 may be provided with a coating 28 that contains a phosphor composition, in which case electromagnetic radiation (for example, blue visible light, ultraviolet (UV) radiation, or near-visible ultraviolet (NUV) radiation) emitted by the LED chip 24 can be absorbed by the phosphor composition, resulting in excitation of the phosphor composition to produce visible light that is emitted through the dome 22. As an alternative, the LED chip 24 may be encapsulated on the PCB 26 with a coating, and such a coating may optionally contain a phosphor composition for embodiments in which LED-phosphor integration with LED epitaxial (epi) wafer or die fabrication is desired.

To promote the capability of the lamp 10 to emit visible light in a nearly omnidirectional manner, the enclosure 12 is represented in FIG. 1 as substantially spheroidal or ellipsoidal in shape. To further promote a near omnidirectional lighting capability, the enclosure 12 may be formed of a material that enables the enclosure 12 to function as an optical diffuser. As a nonlimiting example, the enclosure 12 may be or may include an assembly comprising a pair of semispherical diffusers between which an internal reflector (not shown) may be disposed, such that visible light generated by the LED devices is directed into the interior of the enclosure 12, a portion of the generated light is reflected by the reflector into the semispherical diffuser nearer the base 16, through which the reflected light is distributed to the environment surrounding the lamp 10. The remainder of the generated light passes through an opening in the reflector and enters the second semispherical diffuser, through which the passed light is distributed to the environment surrounding the lamp 10. Materials commonly employed to produce the diffuser may include polyamides (nylon), polycarbonate (PC), and/or polypropylene (PP) that typically may contain a filler, for example, titania ($TiO_2$) to promote refraction of the visible light and thereby achieve a white reflective appearance. The inner surface of the enclosure 12 may be provided with a coating (not shown), for example, a coating that contains a phosphor composition.

As noted above, current approaches to achieving white light illumination include combinations of LEDs that generate light of different colors to create a spectral power distribution that is perceived by an average human eye to be white. For example, by locating red, green and blue LEDs adjacent to one another and appropriately tailoring their outputs, the resulting light appears to be white. As also noted above, another approach involves combinations of LEDs with certain phosphors. As a nonlimiting example, certain yellow phosphor coatings (for example, a cerium(III)-doped yttrium aluminum garnet (YAG; $Y_3Al_5O_{12}:Ce^{3+}$) or lutetium aluminum garnet (LuAG; $Lu_3Al_5O_{12}:Ce^{3+}$) phosphor) are able to convert short-wavelengths emitted by an LED (for example, blue light wavelengths of about 450 to 470 nanometers) to yield an emission that ranges from green to red light, with much of the output of the phosphor coating appearing to be yellow. In combination with remaining blue light produced by the LED, the color of the visible light produced by the LED/coating combination appears white. Such combinations of "blue LEDs" and "yellow phosphors" (and in certain cases "green phosphors") can be further combined with "red phosphors," for example, a $CaAlSiN_3$-based (CASH) phosphor, to generate light that is perceived to be white to an average human eye.

Though the use of combinations of different LED devices and/or phosphors can be utilized to promote the ability of LED lamps to produce a white light effect, additional factors are typically considered when assessing the qualities of white light generated by a lamp. As an example, it is often desirable to tailor the visible light output of lamps used in certain applications to achieve a desired color rendering index, which is used as a measure of fidelity of a light source, i.e., how true a light source is when compared to a reference (ideal or natural) light source. Natural outdoor light is considered to have a CRI of 100, whereas a CRI of 80 or better is generally considered to sufficiently maximize the intensity of colors for general applications such as offices. Another index considered for LED-based lamps is the color saturation index (CSI), which is a statistical index that indicates the ability of light to make colors vivid and easily distinguishable. Whereas low CSI levels are often preferred for certain applications desiring white light illumination, for example, a CSI value below zero to avoid or minimize perceptually noticeable color shifts (statistically indicated by the color fidelity index, CFI), there are certain situations in which some level of color saturation can have a desirable effect in white light illumination applications.

BRIEF DESCRIPTION

The present invention provides LED-based lighting units and optical components and materials therefor that are suitable for use in lighting units to obtain or approximate white light illumination while also achieving a CSI value of zero or greater.

According to one aspect of the invention, an LED-based lighting unit includes an LED-based light source that generates blue light, and an optical component and a phosphor coating on the optical component through which the blue light passes. The phosphor coating contains at least a yellow phosphor and a red phosphor. As a result of the phosphor coating being illuminated by the blue light, the yellow phosphor converts at least a portion of the blue light to yield an emission that includes yellow light, the red phosphor emits a red light, and in combination the yellow light, the red light, and an unconverted portion of the blue light produce visible light perceived by an average human eye to be white and characterized by a CSI value of about zero or greater.

Additional aspects of the invention include utilization and production of a Nd—O—F compound or a neodymium oxyfluoride compound containing $Nd^{3+}$ ions, wherein the Nd—O—F compound or a neodymium oxyfluoride compound is incorporated into a material that forms at least a portion of the optical component through which the blue light passes. The Nd—O—F compound or a neodymium oxyfluoride compound is capable of promoting refractive index matching or mismatching with the material of the optical component to minimize or promote, respectively, optical scattering of the blue light passing through the optical component, and to filter a portion of the yellow light while maintaining or conferring a CSI value of about zero or greater.

Technical effects of lighting units, optical components, and materials described above preferably include the capability of using one or more LED-based light sources to produce visible light that can be perceived by an average human eye to be white, and to promote the CSI of that light to promote certain illumination effects.

Other aspects and advantages of this invention will be better appreciated from the following detailed description.

BRIEF DESCRIPTION OF THE DRAWINGS

FIG. 5 contains two tables evidencing higher CSI values for wavelengths ranging from green to blue and achieved with the LED-based lamp of FIG. 4 relative to the LED-based lamp of FIG. 3.

DETAILED DESCRIPTION

The following discussion will refer to phosphors and LEDs of particular colors, for example, blue LEDs, yellow phosphors, red phosphors, etc. The use and definitions of such terms herein in reference to phosphors and LEDs, as well as in reference to the light they generate, shall be understood to refer to the dominant color of the electromagnetic emission of the LED or phosphor as perceived by an average human eye, with the understanding that the output of the LED or phosphor can encompass a wider or narrower range of wavelengths than might be understood for that particular color of the visible light spectrum. Furthermore, the terms "white light" and "white light illumination" shall be understood to refer to light that is perceived by an average human eye to be white, and "LED-based" lamps and lighting units will be used to refer to lighting appliances that include an LED as a source of light. The following discussion will also make specific references to the LED-based lighting unit 10 represented in FIG. 1 and the LED device 20 represented in FIG. 2. However, it should be appreciated that lighting units and LED devices of various other configurations are also within the scope of the invention.

Figure 1:
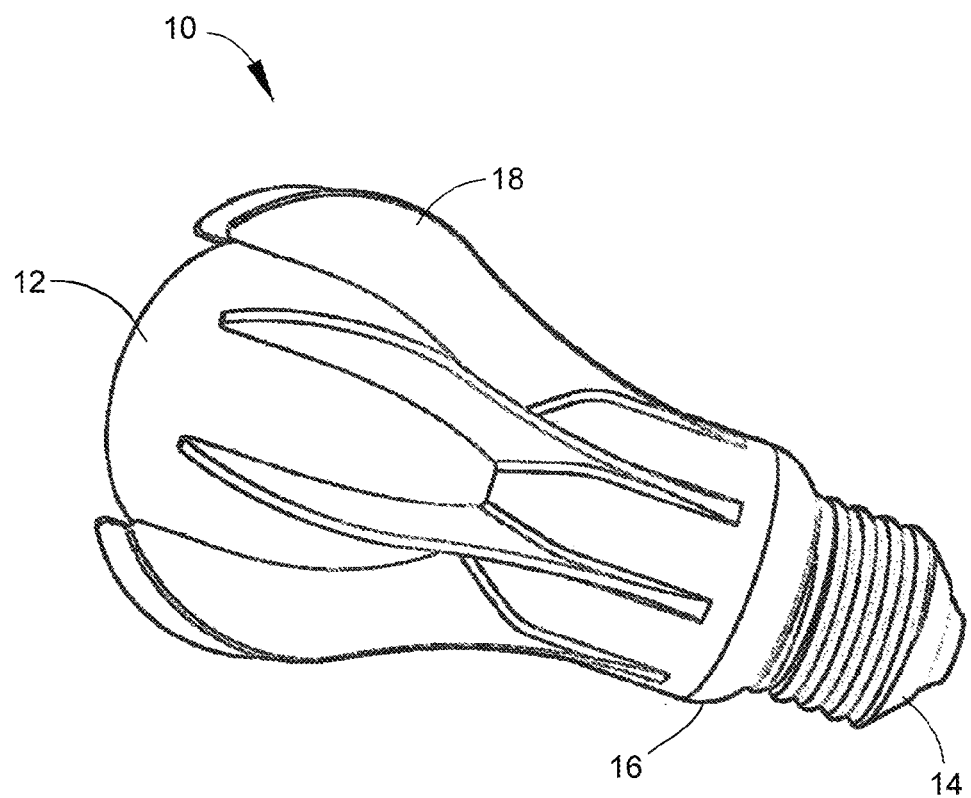
FIG. 1 represents an LED-based lighting unit of a type capable of benefitting from the inclusion of an optical component that includes phosphors in accordance with a nonlimiting embodiment of this invention.

The present invention provides LED-based lamps and optical components and materials therefor that are suitable for use in lighting units to obtain or approximate white light illumination and achieve a relatively high CSI (color saturation index) value, generally of about zero or greater. As used herein, an optical component is an article having at least a portion through which visible light is able to pass to provide a lighting effect. According to a preferred but nonlimiting aspect of the invention, the LED-based lighting unit 10 represented in FIG. 1 is intended to achieve white light illumination, and for this purpose the LED chip 24 is a short-wavelength LED whose emission includes blue visible light ("blue light") and is used in combination with a phosphor composition containing certain phosphors that absorb a portion of the blue light, resulting in excitation of at least one of the phosphors to produce visible light that is emitted through the dome 22. Alternatively or in addition, the LED chip 24 may be encapsulated on the printed circuit board (PCB) 26 with a coating, and such a coating may optionally contain all or a portion of the phosphor composition for embodiments in which LED-phosphor integration with LED epitaxial (epi) wafer or die fabrication is desired. Alternatively or in addition, it is foreseeable that all or a portion of the phosphor composition could be incorporated into the enclosure/diffuser 12 of the lighting unit 10 of FIG. 1. Domes and encapsulants of LED devices, enclosures/diffusers of lighting units, as well as other optical components through which light intentionally passes to provide a lighting effect will be collectively referred to as optical components in the following discussion.

Nonlimiting examples of short-wavelength LEDs that can be used as the LED chip 24 include LEDs that generate a range of wavelengths that include wavelengths of about 450 to 470 nanometers, particular but nonlimiting examples of which include InGaN LEDs.

Nonlimiting examples of phosphor compositions that can be used with the invention contain at least one yellow phosphor and at least one red phosphor, which may be present together in a single coating or present together or separate in multiple coatings. Nonlimiting examples of yellow phosphors include cerium(III)-doped yttrium aluminum garnet (YAG; $Y_3Al_5O_{12}:Ce^{3+}$), lutetium aluminum garnet (LuAG; $Lu_3Al_5O_{12}:Ce^{3+}$), $Tb_3Al_5O_{12}:Ce^{3+}$, and $CaGa_2S_4:Eu^{2+}$ phosphors, which are able to convert blue light emitted by the LED device 24 (for example, emitting wavelengths within a range of about 400 to about 470 nm) to yield an emission that includes yellow light (for example, wavelengths of about 500 to about 600 nm), but may range from green to red light (for example, wavelengths of about 510 to about 650 nm) with the output of the yellow phosphor coating being predominantly yellow light. As such, the LED device 24 and the yellow phosphor of the phosphor composition achieve the effect referred to as blue-shifted yellow (BSY).

Nonlimiting examples of red phosphors include red nitride phosphors, a nonlimiting example of which is a $CaAlSiN_3$-based (CA SN) phosphor, which emits red light and may include wavelengths of about 570 to about 700 nm. In combination with remaining blue light produced by the LED device 24, the color of the visible light produced by the LED device 20 or at least produced by the lighting unit 10 is perceived to be white to an average human eye. According to a preferred aspect of the invention, the white light is characterized by a CSI value of about zero or greater, which statistically indicates that, if discernible, the individual bands of wavelengths (monochromatic light) that make up the white light would be vivid and easily distinguishable. Situations in which white light illumination having sonic level of color saturation would have a desirable effect include product displays and various area lighting applications in residential, commercial and municipal settings, for example, applications capable of utilizing the reveal™ line of incandescent bulbs commercially available from GE Lighting.

Figure 3:
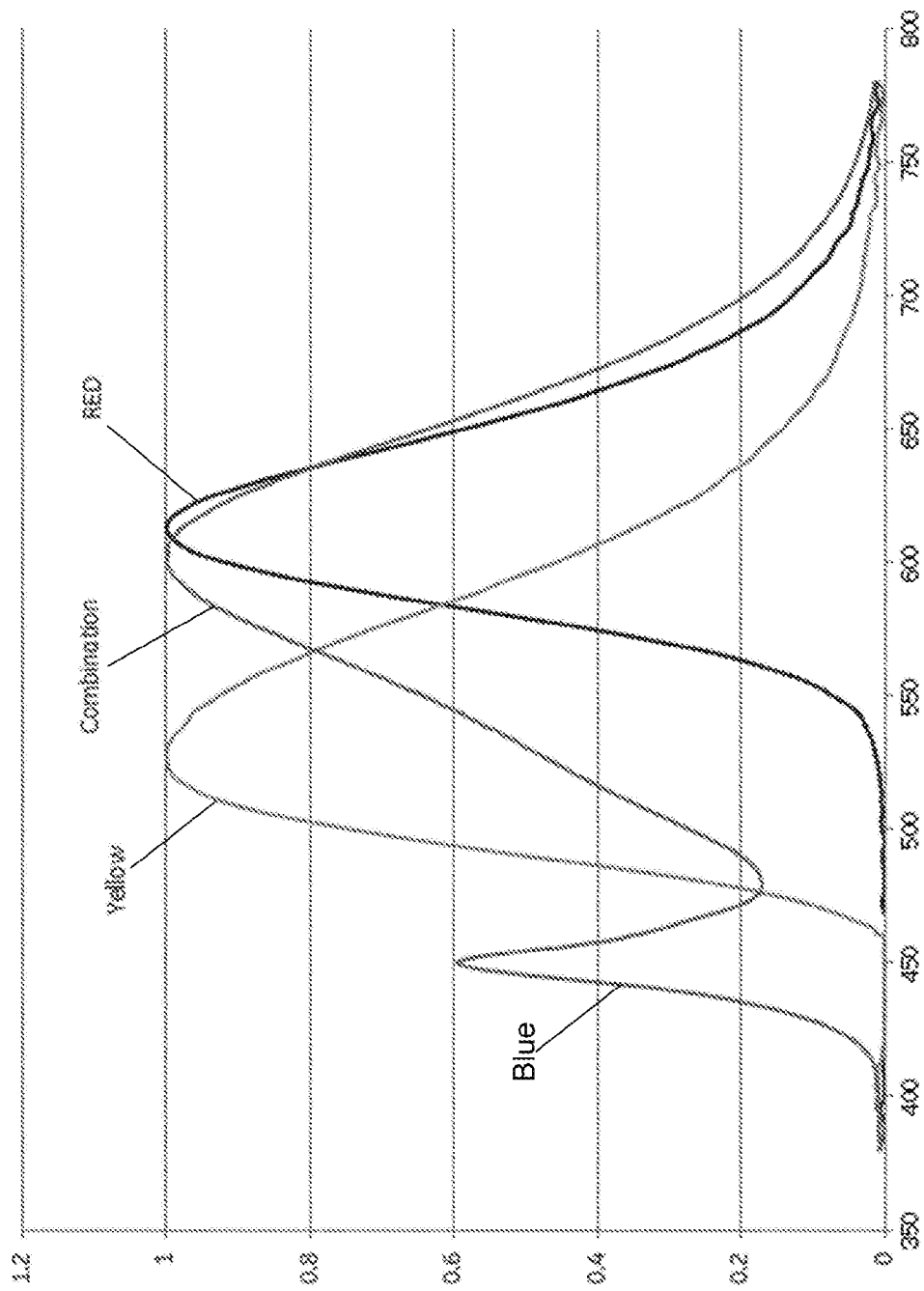
FIG. 3 is a graph representing the spectral power distribution of an LED-based lamp that utilizes a blue LED and a combination of yellow and red phosphors to produce light perceived by an average human eye to be white and characterized by a CSI of less than zero.

FIG. 3 contains a graph that plots the spectral power distribution (SPD) of a "standard" LED-based lamp that utilized a blue LED device and a combination of yellow and red phosphors to produce light perceived by an average human eye to be white. The LED device was a package containing a "blue pump" LED (e.g., around 450 nm), the yellow phosphor was YAG, and the red phosphor was nitride-based $CaAlSiN_3:Eu$, The yellow phosphor served to convert blue light emitted by the LED device to yield an emission that included yellow light (i.e., a BSY combination). The yellow and red phosphors were applied directly to the LED package or as "remote" coating located apart from the package. The visible light ("Combination") emitted by the lamp was a warm white light with a CCT (correlated color temperature) of 2700K, and was characterized by a CSI of less than zero, specifically, negative 16, corresponding to a relatively high color fidelity index (CFI) that is indicative of no perceptually noticeable color shift.

Figure 4:
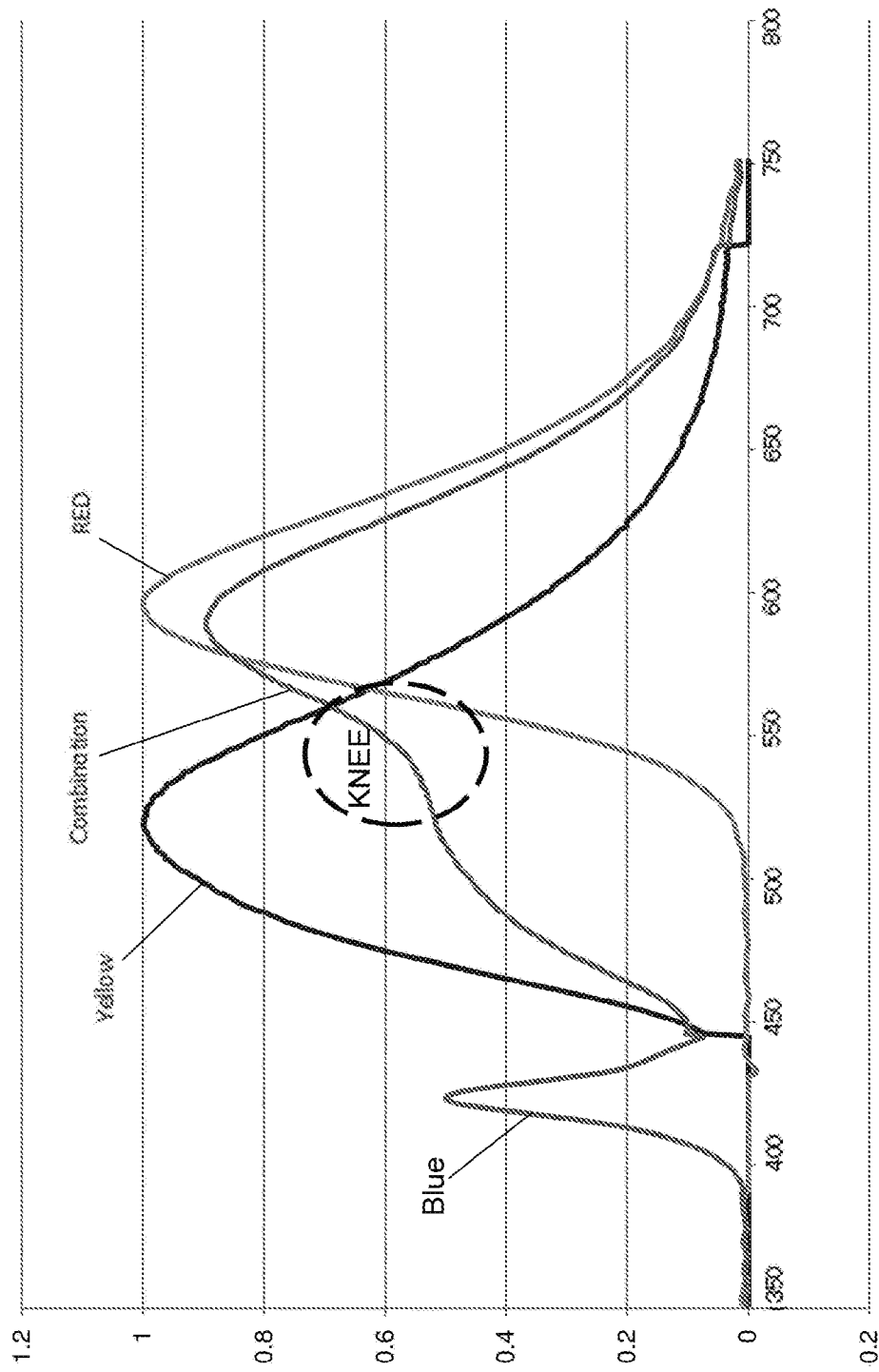
FIG. 4 is a graph representing the spectral power distribution of an LED-based lamp that utilizes a blue LED and a modified combination of yellow and red phosphors to produce light that is perceived by an average human eye to be white and is characterized by a CSI of about zero.

FIG. 4 is a similar graph representing the SPD of a "modified" LED-based lamp that utilized an identical blue LED device and the same yellow and red phosphors used to produce the data of FIG. 3. However, the relative amounts of the yellow and red phosphors were modified relative to those used to produce the SPD of FIG. 3. The visible light ("Combination") emitted by the lamp was a warm white light (CCI of about 2900K), but was characterized by a CSI value of about zero. The higher CSI value was concluded to be associated with a lower peak for the white light and a lower white light level above wavelengths of about 530 nm, and particularly over a wavelength range of about 550 to 610 nm, as compared to the "Combination" visible light of FIG. 3. Graphically, the white light over this range is accompanied by a "knee" (or inflection point in the combined spectrum) identified in the plotted curve for the white light between the blue and yellow emission peaks, and particularly over a range of wavelengths including about 460 to 580 nm. In the present example, an inflection point in the combined spectrum appears at between about 500 nm and. about 550 nm. In addition, the data plotted in FIG. 4 indicated a shift in the peak wavelengths of yellow and red light, characterized by the peak of each being at lower wavelengths than in the data plotted in FIG. 3.

The higher CSI value is also believed to be indicated by the data in FIG. 5, which reports CSI values for the individual bands of wavelengths (monochromatic light) that make up the white light of FIGS. 3 and 4. The data in FIG. 5 evidence that wavelengths corresponding to green, blue-green, and blue light were considerably higher for the "Modified" lamp of FIG. 4 than for the "standard" lamp of FIG. 3, indicating that these wavelengths, if perceptible to the human eye, would be more vivid and easily distinguishable.

From these results, to achieve a CSI value of zero or greater, it is believed that the ratio of the yellow light produced by the BSY effect and the red light produced by the red phosphor must be controlled by intentionally controlling the ratio of the yellow and red phosphors used to generate the yellow and red lights, respectively. On the basis of the data in FIG. 5, a suitable range for this ratio (yellow: red phosphor) is believed to be about 1:2 to about 2:1 by spectral weight, depending on the targeted color coordinates for the design under consideration. This range is believed to be particularly appropriate and effective if the LED device utilizes a BSY-red phosphor combination, which as used herein refers to a red phosphor used in combination with a yellow phosphor that generates yellow light by converting a portion of blue light emitted by a blue LED device.

On the basis of the data in FIG. 5, it was further concluded that the relative amounts of yellow and red phosphors in a BSY-red phosphor combination to achieve a higher CSI value could also compensate for additive compounds that might otherwise be utilized to promote the emission of wavelengths that include green, blue-green, and/or blue light. A notable example of such a desirable lighting effect is achieved with the aforementioned reveal™ line of incandescent bulbs, which are produced to have an outer jacket formed of a glass doped with neodymia ($Nd_2O_3$) to filter certain wavelengths of light, particularly in terms of the ability to filter yellow light wavelengths. The neodymia content of the outer jacket of such known incandescent lamps serves to selectively modify the visual appearance and spectral power distribution of white light produced by an incandescent bulb and, in so doing, achieve a perceptible increase in green, blue-green, and/or blue light. A somewhat similar effect is believed to be achieved with the "modified" lamp of FIG. 4 as a result of the enhanced CSI for the green, blue-green, and blue light wavelengths indicated in FIG. 5. Consequently, in applications where neodymia or another neodymium-based compound might be used to promote a desirable lighting effect with an LED-based lighting unit, for example, by incorporating neodymia in the dome 22 of the LED chip 24, or in an encapsulant of the LED chip 24, or in an enclosure/diffuser 12 of the lighting unit 10, it may be possible to reduce or omit the amount of neodymia otherwise required to achieve such an effect by appropriately tailoring the amounts of yellow and red phosphors to achieve a relatively high CSI value, for example, about zero or higher.

In addition to tailoring the amounts of yellow and red phosphors in a BSY-red phosphor combination, a neodymium-based compound has been identified as well suited for incorporation into an LED device or lighting unit to generate a white light characterized by a CSI value of approximately zero or higher, as described in reference to FIGS. 4 and 5. In particular, a neodymium oxyfluoride can be utilized in which the relative amounts of neodymia. ($Nd_2O_3$) and neodymium fluoride ($NdF_3$) are controlled in a manner that enables the neodymium oxyfluoride compound to complement a BSY-red phosphor combination to attain high CSI values while also contributing to a desirable lighting effect, for example, similar to that achieved with the reveal™ line of incandescent bulbs. Nd—F and Nd—X—F compounds containing a source of $Nd^{3+}$ ions have been determined to be effective for providing a color filtering effect, in particular, to filter visible light in the yellow light wavelength range, for example, wavelengths of about 560 to about 600 nanometers. As used herein, an "Nd—F" compound is a compound consisting of Nd and F. An Nd—X—F compound is a compound comprising Nd, F, and X, where X is at least one element that forms a compound with neodymium, as examples, oxygen, nitrogen, sulfur, chlorine, etc., or at least one metallic element (other than Nd) that forms a compound with fluorine, as examples, metallic elements such as Na, K, Al, Mg, Li, Ca, Sr, Ba, and Y, or combinations of such elements. One example of an Nd—X—F compound is $NdO_xF_y$, where, x is from 0 to less than 1.5, and y is from about 0.1 to 3, and x and y are chosen so that the Nd is trivalent. At the extreme where x is 0, then y=3, and the compound is $NdF_3$. Another embodiment is where x is 1 and y is 1, which results in NdOF. Some kinds of neodymium compounds which may be employed in the embodiments of the present disclosure include the Nd—M—F and Nd—X—F and Nd—O—F compounds described in commonly owned international application PCT/CN2015/070191, filed 6 Jan. 2015 (GE Docket 274946) and in commonly-owned international application PCT/CN2014/088116, filed 8 Oct. 2014 (GE Docket 275441), both of which are hereby incorporated by reference.

Figure 6:
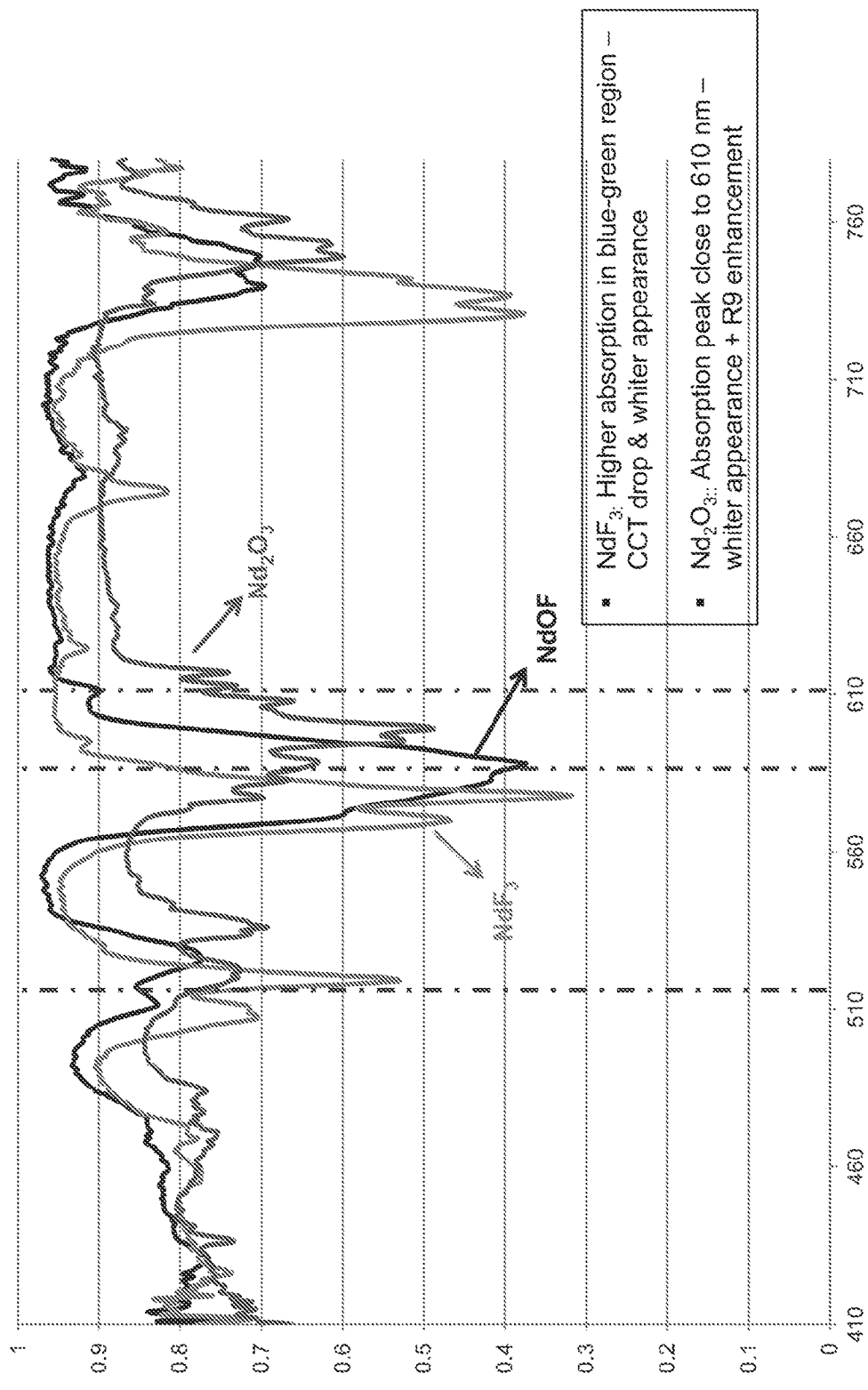
FIG. 6 is a graph comparing the absorption of neodymium oxide, neodymium fluoride, and a neodymium oxyfluoride compound.

FIG. 6 is a graph representing the optical transmission observed for neodymnia ($Nd_2O_3$), neodymium fluoride ($NdF_3$), and neodymium oxyfluoride ($NdO_xF_y$). The graph evidences similarities in their optical transmissions, particularly in terms of their abilities to filter yellow light wavelengths, for example, over a range of about 550 to about 610 nm. FIG. 6 evidences that the absorption peaks of $Nd_2O_3$, $NdF_3$, and NdOF (about 1:1 molar ratio of $NdF_3$ and $Nd_2O_3$) were slightly shifted relative to each other, and that both $NdF_3$ and NdOF exhibited greater absorption in the yellow-orange region (wavelengths of roughly 560 to 590 nm) as compared to $Nd_2O_3$. Furthermore, $NdF_3$ exhibited significantly greater absorption in the blue-green region (wavelengths of roughly 500 to 520 nm) and red region (wavelengths of roughly 720 to 750 nm). From FIG. 6, it was concluded that NdOF offers an excellent combination of properties that include the ability to absorb wavelengths in the yellow-orange region, but without the degree of absorption associated with $NdF_3$ in the blue-green and red regions.

Figures 7, 8:
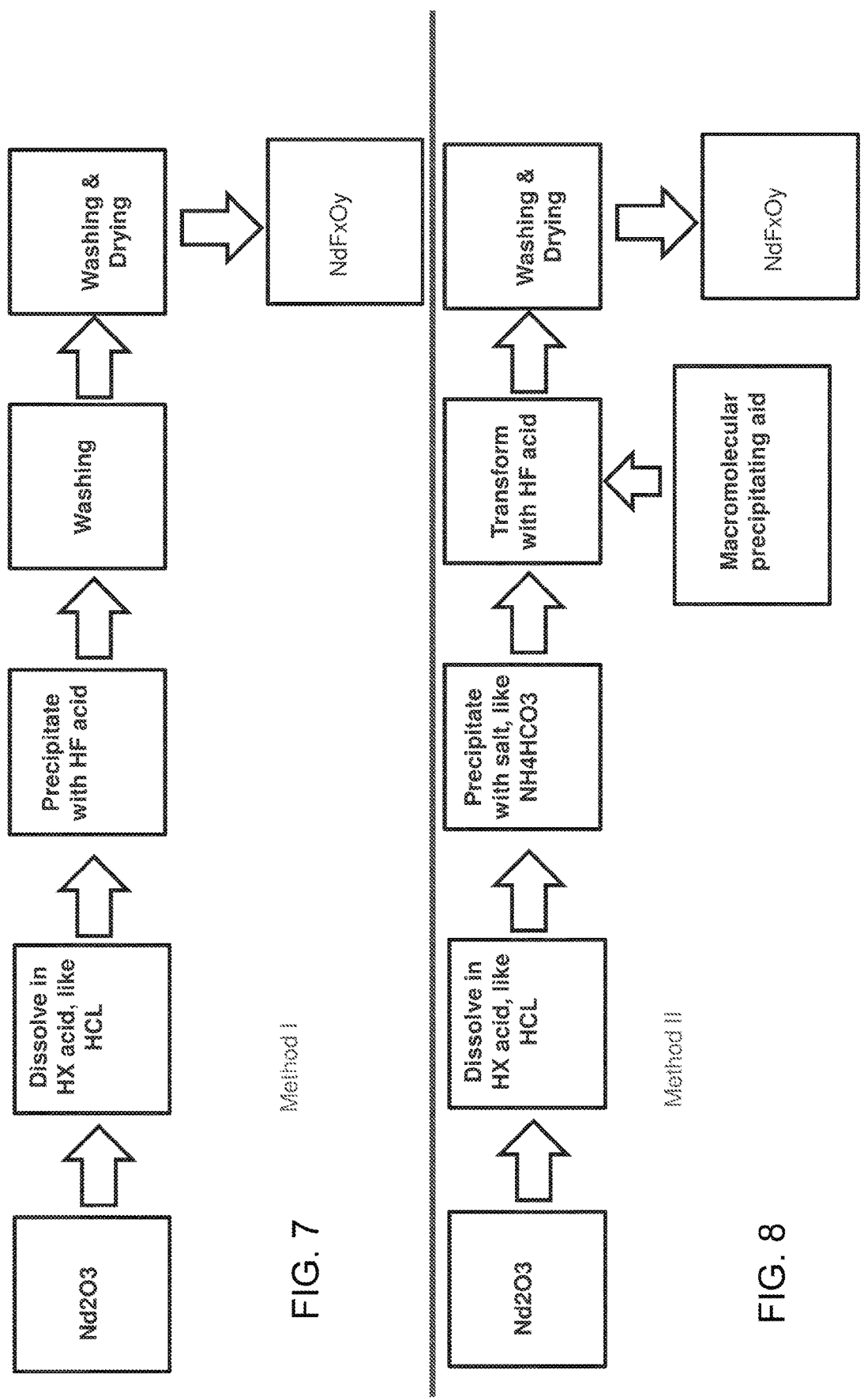
FIGS. 7, 8 and 9 contain flow diagrams that represent steps of three different processes that can be performed to produce a neodymium oxyfluoride compound.
Figure 9:
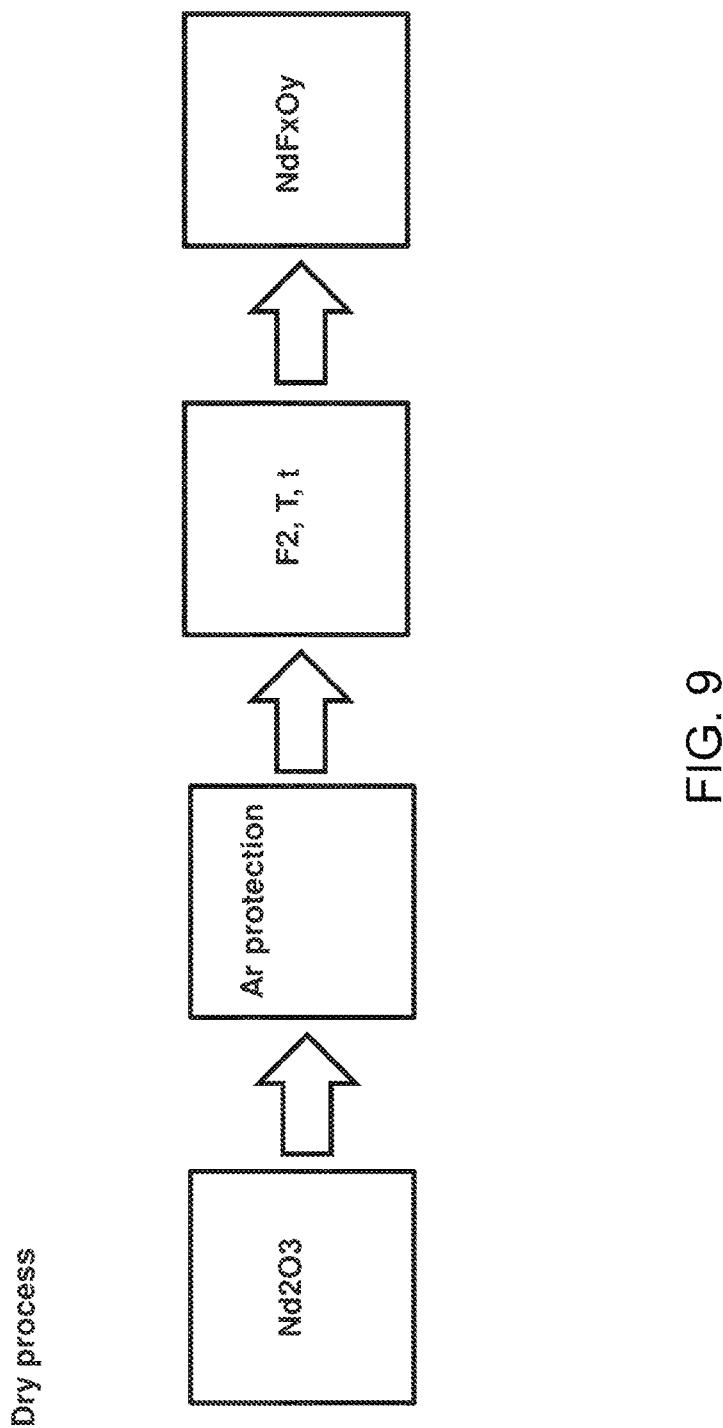

To achieve a CSI value of zero or greater in an LEI) device or lighting unit that uses a BS-red phosphor combination to generate a white light and that further uses an optical component that contains NdOF (an Nd—O—F compound) as described above, it is believed that the concentration ratio of $NdF_3$ and $Nd_2O_3$ in the Nd—O—F compound can be controlled to determine the absorption region of the Nd—O—F compound in the visible light region, corresponding to a higher CSI value as discussed above, as well as potential increases in CRI and R9 score (deep red color rendering index) and potential decreases in CCT. As such, it is believed that a desirable color filtering effect can be achieved with the evaluated NdOF, though it is believed that a sufficient effect can be achieved with an Nd—O compound that has been doped with an Nd—F compound to yield an Nd compound containing at least 0.1% up to about 99% $NdF_3$, with the balance essentially or entirely $Nd_2O_3$. Processes that can be employed to produce such Nd—O—F (i.e., $NdO_xF_y$) compounds include two "wet" processes schematically depicted in FIGS. 7 and 8 and a "dry" process schematically depicted in FIG. 9. In FIG. 7, a neodymium oxide may be dissolved in a hydrohalide acid (HX) such as HCl. Then, HF acid may be added to form a precipitate. The precipitate may be washed with a solvent such as water, and then substantially dried to form a Nd—O—F compound such as $NdO_xF_y$. In FIG. 8, a neodymium oxide may be dissolved in a hydrohalide acid (HX) such as HCl. An alkaline salt such as ammonium bicarbonate ($NH_4HCO_3$) may be added so as to form a precipitate. The precipitate may be treated or transformed with hydrofluoric acid, optionally in the presence of a macromolecular precipitating aid. After washing and drying, a Nd—O—F; compound such as $NdO_xF_y$ may be obtained. In FIG. 9, a neodymium oxide may be placed under the protection of an inert gas (such as Ar), and treated with fluorine gas (or other fluorine-containing oxidant gas, such as $OF_2$), for a specified period of time (t) at an effective temperature (T), to provide a Nd—O—F compound such as $NdO_xF_y$.

According to certain aspects of the invention, composite materials that contain an Nd—O—F compound in a matrix material and which are used to form an optical component can have little if any optical scattering (diffusion) effect or may cause considerable optical scattering on light passing therethrough, depending on the composition of the composite material, the composition of the matrix material, and the composition and amount of the Nd—O—F compound in the composite material. As examples, preferred composite materials comprise a polymeric matrix material in which is dispersed an inorganic particulate material containing an Nd—O—F compound as a source of $Nd^{3+}$ ions. The Nd—O—F compound may be present as a dopant in the particulate material, or as discrete particles that may be optionally combined with discrete particles of other materials to make up the particulate material. A particulate material containing discrete particles of the Nd—O—F compound (e.g., formed partially or entirely of the Nd—O—F compound) and/or discrete particles doped with the Nd—O—F compound can be combined with a polymeric matrix material for the purpose of promoting refractive index matching of the particulate and polymeric matrix materials (i.e., minimize the difference in their refractive indices) sufficient to impart a low-haze (low-diffusivity) optical effect to visible light passing through the composite material. Alternatively, a particulate material can be solely made up of discrete particles of the neodymium oxyfluoride compound (e.g., formed partially or entirely of the Nd—O—F compound) and/or made up of a mixture of discrete particles of the Nd—O—F compound (e.g., formed partially or entirely of the Nd—O—F compound) and discrete particles formed of at least one other different material, so that the particulate material has a refractive index that is sufficiently different from that of the polymeric matrix material to achieve a refractive index mismatch between the particulate and polymeric matrix materials (i.e., increase the difference in their refractive indices) to impart a diffusive optical effect to visible light passing through the composite material.

Figure 2:
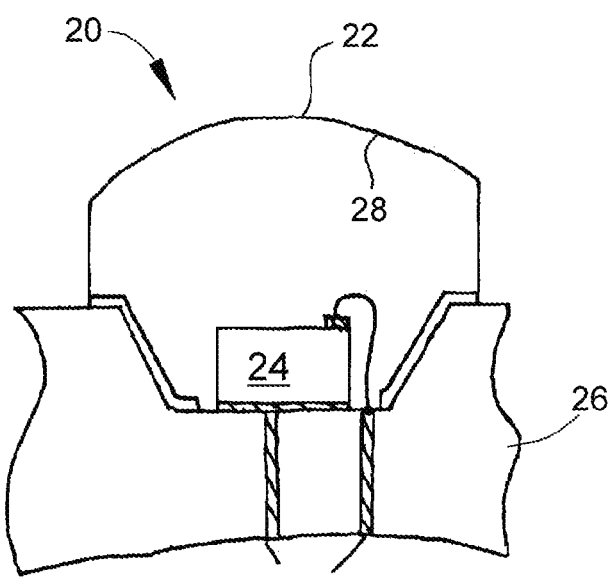
FIG. 2 represents a fragmentary cross-sectional view of an LED device of a type capable of use in an LED-based lighting unit, for example, of the type represented in FIG. 1.

In view of this ability to tailor the optical scattering effect of the composite material, optical components formed of a composite material containing the Nd—O—F compound may provide a color filtering effect, such as if used to form the dome 22 or encapsulant for the LED device 20 of FIG. 2, or to additionally provide an optical scattering effect, such as if used to form the enclosure/diffuser 12 of the lighting unit 10 of FIG. 1. The concentration ratio of $NdF_3$ and $Nd_2O_3$ in the Nd—O—F compound determines the refractive index of the Nd—O—F compound, ranging from the refractive index of $NdF_3$ (about 1.6) and the refractive index of $Nd_2O_3$ (about 1.80) at wavelengths of about 589 nm, which is able to provide a suitably low refractive index for index matching with certain polymeric matrix materials to minimize scattering losses. The optical scattering effect of an optical component formed of a composite material containing the Nd—O—F compound can be further tailored as a result of using the Nd—O—F compound in combination with other materials, for example, by doping a perovskite structure with the Nd—O—F compound. Nonlimiting examples of perovskite structure materials that can be doped with the Nd—O—F compound include those containing at least one constituent having a lower refractive index than the Nd—O—F compound, for example, metal fluorides of Na, K, Al, Mg, Li, Ca, Sr, Ba, and Y. Such "host" compounds have lower refractive indices than the Nd—O—F compound in the visible light region, nonlimiting examples of which include NaF (n=1.32), KF (n=1.36), $AlF_3$ (n=1.36), $MgF_2$ (n=1.38), LiF (n=1.39), $CaF_2$ (n=1.44), $SrF_2$ (n=1.44), $BaF_2$ (n=1.48), and $YF_3$ (n=1.50) at a wavelength of 589 nm, As a result of doping with a high refractive index Nd—O—F compound, the resulting doped perovskite structure compound has a refractive index that is between that of the host (for example, 1.38 for $MgF_2$) and the Nd—O—F compound.

Generally, a low-haze (low-diffusivity) optical effect due to a minimal level of optical scattering is said to be achieved herein if the refractive indices of the matrix and particulate materials are within 0.1 of each other in the visible light region. If the Nd—O—F compound is used as the sole inorganic particulate material in an optical component whose polymeric matrix material is a polycarbonate (PC) or polystyrene (PS), the refractive indices of the Nd—O—F compound (from about 1.60 to about 1.80) and PC and PS (about 1.586) are such that a minimal level of optical scattering can occur when light passes through the component. Another example of a polymer having a refractive index within 0.1 of the Nd—O—F compound is a fluorine-doped polyester (refractive index of about 1.607). In this regard, the polymeric matrix material is chosen on the basis of having a refractive index that is similar to the Nd—O—F compound so as to achieve a low-haze (low-diffusivity) optical effect.

Refractive index matching with other polymers having refractive indices that differ from the Nd—O—F compound in the visible light region by more than 0.1 can be achieved with modifications to the particulate material. For example, the Nd—O—F compound can be used in combination with one or more other materials to yield an effective refractive index that achieves a minimal level of optical scattering in an optical component whose polymeric matrix material has a refractive index that differs from the Nd—O—F compound by more than 0.1 in the visible light region, for example, acrylics (fir example, polymethyl methacrylate; PMMA), polyvinylidene fluoride (PVDF), silicone, etc. As a nonlimiting example, particles formed of a metal fluoride and/or a metal oxide can be doped with the Nd—O—F compound to have a refractive index between that of the Nd—O—F compound and the metal fluoride and/or metal oxide. Nonlimiting examples of suitable metal fluorides and metal oxides include NaF (refractive index of about 1.32) and $MgF_2$ (refractive index of about 1.38). By selecting an appropriate ratio of the Nd—O—F compound and the metal fluoride and/or metal oxide, the refractive index of the particulate material can be tailored to allow for matching or near matching with the refractive index of PMMA (about 1.49), polyvinylidene fluoride (about 1.42), or a methyl-type silicone (about 1.41), which are often utilized in LED packages.

A diffusive optical effect due to a significant level of optical scattering is said to be achieved herein if the difference in the refractive indices of the matrix material and particulate materials of the optical component exceeds 0.1 in the visible light region. As one example, the Nd—O—F compound can be used as the sole inorganic particulate material in an optical component whose polymeric matrix material has a refractive index that is sufficiently different from the Nd—O—F compound, for example, PMMA, PVDF, or a silicone. As another example, a particulate material formed of perovskite structure materials containing a metal oxide and the Nd—O—F compound can be used. Such perovskite structure materials include those containing oxides of at least two of Ca, Ba, Al, Y, V, Gd, and Sr, which can exhibit refractive indices of greater than 1.7, such that a desirable color filtering effect and optical scattering can be achieved with these materials when used in combination with polymeric matrix materials such as PC, PS, PMMA, PVDF, or silicone.

Increased refractive index mismatch can also be achieved by combining particles of the Nd—O—F compound with particles of other materials, notable examples of which include metal oxides such as rutile titanic ($TiO_2$; refractive index of about 2.74) and Nd—O compounds (such as $Nd_2O_3$) or other neodymium-containing metal oxides (such as Nd-containing perovskite structure materials). With this approach, the particles of the Nd—O—F compound may be largely or solely responsible for the color filtering effect and the second particles may be largely or solely responsible for achieving a significant level of optical scattering.

The color filtering effect resulting from visible light absorption provided by the Nd—O—F compound in the visible light spectrum is believed to be superior to Nd—O compounds (such as $Nd_2O_3$) with respect to yellow light wavelengths within the range of 560 to about 600 nanometers. The Nd—O—F compound has a further advantage over Nd—O compounds by having a refractive index much closer to various standard optical grade transparent plastics, for example, PC, PS, PMMA, PVDF, silicone, and polyethylene terephthalate (PET), and can better balance optical losses from scattering attributable to refractive index mismatch and Nd ion absorption. By filtering yellow light wavelengths, light emitted by an array of white LEI) devices can be adjusted to achieve an enhanced color effect by separating green and red light through filtering yellow light wavelengths. In addition to increasing CSI, such an effect can be promoted by increasing the CRI (color rendering index) of white light generated with an LED device and/or enabling color points closer to the white locus, for example, similar to the desirable lighting effect achieved with the reveal™ line of incandescent bulbs.

The volumetric amount and particle size of the Nd—O—F compound in a composite material used to form an optical component is believed to have an influence on the color filtering effect of the composite material. In addition, the relative amounts and particle size of any second material in the composite material have an influence on the color filtering effect. Generally, it is believed that a composite material formed of a standard optical grade transparent plastic (for example, PC, PS, PMMA, PVDF, silicone, or PET) should contain at least 0.1 volume percent and more preferably about 1 to about 20 volume percent of the Nd—O—F compound to achieve a desired filtering effect. If present, any second material (e.g., $TiO_2$, Nd-containing compounds, perovskite structure materials having a high refractive index relative to $NdF_3$, etc.) may be present in an amount of up to 20 volume percent, more preferably about 0.01 to about 2 volume percent, depending on the scattering profile desired for an optical diffuser. A preferred total particulate loading in the composite material is believed to be at least 0.01 up to about 20 volume percent, more preferably about 0.01 to about 2 volume percent. It is further believed that a suitable particle size for the particulate material is up to about 50 micrometers and preferably about 0.5 to about 5 micrometers. At these loadings and particles sizes, a composite material whose matrix material is one of the aforementioned standard optical grade transparent plastics will typically be readily moldable for a wide variety of shapes, with potential difficulties being encountered with smaller particle sizes and higher loadings.

While the invention has been described in terms of certain embodiments, it is apparent that other forms could be adopted by one skilled in the art. Finally, while the appended claims recite certain aspects believed to be associated with the invention as indicated by the investigations discussed above, they do not necessarily serve as limitations to the scope of the invention.

The invention claimed is:

1. An LED-based lighting unit comprising:
    an LED-based light source that generates blue light;
    an optical component through which the blue light passes, the optical component (i) enclosing the LED-based light source and (ii) comprising a phosphor blend;
    wherein the phosphor blend comprises at least a yellow phosphor and a red phosphor, the yellow phosphor converting at least a portion of the blue light to yield an emission that includes yellow light as a result of the phosphor coating being excited by the blue light, the red phosphor emitting a red light;
    wherein the yellow light, the red light, and an unconverted portion of the blue light produce in combination a visible light (i) comprising an approximately white light and (ii) being characterized by a color saturation index (CSI) value greater than zero; and
    wherein the CSI value is configured based on a defined combination of relative amounts of the yellow phosphor and the red phosphor in the phosphor blend, the relative amounts including a yellow phosphor: red phosphor ratio of 1:2 to 2:1 by spectral weight.

2. The LED-based lighting unit according to claim 1, wherein the phosphor blend is present as a coating on the optical component.

3. The LED-based lighting unit according to claim 1, wherein the visible light is characterized by a spectral power distribution containing curves and peaks corresponding to each of the blue light, the yellow light, the red light, and the white light,
    wherein an intensity for the peak of the white light is lower than an intensity for the peaks of the yellow and red lights.

4. The LED-based lighting unit according to claim 3, wherein the peak of the white light is at a wavelength of greater than about 530 nm.

5. The LED-based lighting unit according to claim 3, wherein the peak of the white light is within a wavelength range of from about 550 nm to about 610 nm.

6. The LED-based lighting unit according to claim 3, wherein the curve for the spectral power distribution of the white light comprises an inflection point at a wavelength between the peaks of the blue light and the yellow light.

7. The LED-based lighting unit according to claim 1, wherein at least a portion of the optical component comprises a composite material comprising a polymeric material and an inorganic particulate material, the inorganic particulate material comprising a Nd—O—F compound.

8. The LED-based lighting unit according to claim 7, wherein the Nd—O—F compound formally comprises about 0.1 to about 99 molar percent NdF3, with the balance essentially Nd2O3.

9. The LED-based lighting unit according to claim 7, wherein the Nd—O—F compound is NdOF.

10. The LED-based lighting unit according to claim 7, wherein the Nd—O—F compound and the polymeric material have refractive indices within 0.1 of each other in the visible light region.

11. The LED-based lighting unit according to claim 7, wherein the Nd—O—F compound and the polymeric material have refractive indices that differ by more than 0.1 of each other in the visible light region.

12. The LED-based lighting unit according to claim 1, wherein the optical component is an enclosure or dome or encapsulant for the LED-based light source.

13. The LED-based lighting unit according to claim 1, wherein the optical component is a diffuser of the lighting unit.

14. An LED-based lighting unit comprising:
    an LED-based light source that generates blue light:
    an optical component through which the blue light passes, the optical component (i) comprising a phosphor blend and (ii) being an enclosure or dome or encapsulant for the LED-based light source;

wherein the phosphor blend comprises at least a yellow phosphor and a red phosphor, the yellow phosphor converting at least a portion of the blue light to yield an emission that includes yellow light as a result of the phosphor coating being excited by the blue light, the red phosphor emitting a red light;

wherein at least a portion of the optical component comprises an inorganic particulate material comprises a Nd—O—F compound;

wherein the yellow light, the red light, and an unconverted portion of the blue light produce in combination a visible light (i) comprising an approximately white light and (ii) being characterized by a color saturation index (CSI) value greater than zero; and wherein the CSI value is configured based on a defined combination of relative amounts of the yellow phosphor and the red phosphor in the phosphor blend, the relative amounts including a yellow phosphor: red phosphor ratio of 1:2 to 2:1 by spectral weight.

15. An LED-based lighting unit comprising:

an LED-based light source that generates blue light:

an optical component through which the blue light passes, the optical component (i) enclosing the LED-based light source (ii) comprising a phosphor blend and (iii) being a diffuser of the lighting unit;

wherein the phosphor blend comprises at least a yellow phosphor and a red phosphor, the yellow phosphor converting at least a portion of the blue light to yield an emission that includes yellow light as a result of the phosphor coating being excited by the blue light, the red phosphor emitting a red light;

wherein at least a portion of the optical component comprises an inorganic particulate material comprises a Nd—O—F compound;

wherein the yellow light, the red light, and an unconverted portion of the blue light produce in combination a visible light (i) comprising an approximately white light and (ii) being characterized by a color saturation index (CSI) value greater than zero; and wherein the CSI value is configured based on a defined combination of relative amounts of the yellow phosphor and the red phosphor in the phosphor blend, the relative amounts including a yellow phosphor: red phosphor ratio of 1:2 to 2:1 by spectral weight.

* * * * *